(12) United States Patent
Aikawa

(10) Patent No.: US 12,346,617 B2
(45) Date of Patent: Jul. 1, 2025

(54) IMAGE PROCESSING APPARATUS, IMAGE PROCESSING SYSTEM, CONTROL METHOD, AND NON-TRANSITORY COMPUTER-READABLE RECORDING MEDIUM

(71) Applicant: KONICA MINOLTA, INC., Tokyo (JP)

(72) Inventor: Masafumi Aikawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 18/419,861

(22) Filed: Jan. 23, 2024

(65) Prior Publication Data
US 2024/0281182 A1   Aug. 22, 2024

(30) Foreign Application Priority Data
Feb. 17, 2023   (JP) .................................. 2023-023552

(51) Int. Cl.
   *G06F 3/12*   (2006.01)
(52) U.S. Cl.
   CPC .......... *G06F 3/1257* (2013.01); *G06F 3/1204* (2013.01)

(58) Field of Classification Search
   None
   See application file for complete search history.

(56) References Cited

U.S. PATENT DOCUMENTS

| 10,467,050 B1* | 11/2019 | Schmidgall ........... G06F 9/4881 |
| 2002/0103851 A1* | 8/2002 | Kikinis ................... H04L 67/51 |
| | | 709/202 |

FOREIGN PATENT DOCUMENTS

| JP | 2007295604 A | 11/2007 |
| JP | 2020003905 A | 1/2020 |
| JP | 2020194201 A | 12/2020 |

* cited by examiner

*Primary Examiner* — Frantz Bataille
(74) *Attorney, Agent, or Firm* — BUCHANAN, INGERSOLL & ROONEY PC

(57) ABSTRACT

An image processing apparatus is communicable with an information processing terminal, and operates based on a command from the information processing terminal when robotic process automation (RPA) for execution of a specific job is being executed in the information processing terminal. The image processing apparatus includes a storage section that stores a library preprogrammed to sequentially and automatically executes a plurality of processing included in a specific job, and a hardware processor that receives a command to execute the library from the information processing terminal, calls the library from the storage section, and executes the library.

15 Claims, 24 Drawing Sheets

IMAGE PROCESSING SYSTEM 1

Fig. 3

SETTING FILE 25

| No. | TRANSMISSION DESIGNATION | FAX NUMBER | TRANSMISSION TARGET FILE | DESIGNATED TRANSMISSION TIME |
|---|---|---|---|---|
| 1 | X COMPANY | 03-1234-5678 | ¥PC01¥C:¥Document¥BILL01.doc | 2023/02/06 11:30 |
| 2 | Y COMPANY | 041-234-5678 | ¥PC01¥C:¥Document¥BILL02.doc | 2023/02/06 15:30 |
| 3 | Z COMPANY | 06-1234-5678 | ¥PC01¥C:¥Document¥BILL03.doc | 2023/02/06 17:30 |

Fig. 4

LIBRARY  19

| SEQUENCE | DESCRIPTION OF PROCESSING |
|---|---|
| 1 | SETTING FILE ANALYSIS |
| 2 | WAIT UNTIL DESIGNATED TRANSMISSION TIME |
| 3 | TRANSMISSION TARGET FILE ACQUISITION |
| 4 | FAX NUMBER SETTING |
| 5 | FAX TRANSMISSION START |
| 6 | WAIT UNTIL DESIGNATED TRANSMISSION TIME |
| 7 | TRANSMISSION TARGET FILE ACQUISITION |
| 8 | FAX NUMBER SETTING |
| 9 | FAX TRANSMISSION START |
| 10 | WAIT UNTIL DESIGNATED TRANSMISSION TIME |
| 11 | TRANSMISSION TARGET FILE ACQUISITION |
| 12 | FAX NUMBER SETTING |
| 13 | FAX TRANSMISSION START |
| 14 | END NOTIFICATION TRANSMISSION |

Sequences 2–5: FAX TRANSMISSION TO COMPANY X
Sequences 6–9: FAX TRANSMISSION TO COMPANY Y
Sequences 10–13: FAX TRANSMISSION TO COMPANY Z

Fig. 6

RPA 38

| SEQUENCE | DESCRIPTION OF PROCESSING |
|---|---|
| 1 | ACTIVATE FAX TRANSMISSION APPLICATION |
| 2 | SETTING FILE TRANSMISSION |
| 3 | LIBRARY EXECUTION COMMAND TRANSMISSION |
| 4 | END OF FAX TRANSMISSION APPLICATION |

Fig. 10

LIBRARY 19

| SEQUENCE | DESCRIPTION OF PROCESSING |
|---|---|
| 1 | TIME SYNCHRONIZING PROCESSING EXECUTION |
| 2 | SETTING FILE ANALYSIS |
| 3 | WAIT UNTIL DESIGNATED TRANSMISSION TIME |
| 4 | TRANSMISSION TARGET FILE AQCUSITION |
| 5 | FAX NUMBER SETTING |
| 6 | FAX TRANSMITTION START |
| 7 | TRANSMISSION HISTORY RECORD |
| 8 | WAIT UNTIL DESIGNATED TRANSMISSION TIME |
| 9 | TRANSMISSION TARGET FILE AQCUSITION |
| 10 | FAX NUMBER SETTING |
| 11 | FAX TRANSMITTION START |
| 12 | TRANSMISSION HISTORY RECORD |
| 13 | WAIT UNTIL DESIGNATED TRANSMISSION TIME |
| 14 | TRANSMISSION TARGET FILE OPEN |
| 15 | FAX NUMBER SETTING |
| 16 | FAX TRANSMITTION START |
| 17 | TRANSMISSION HISTORY RECORD |
| 18 | END NOTIFICATION TRANSMISSION |

Sequences 3–6: FAX TRANSMISSION TO COMPANY X
Sequences 8–11: FAX TRANSMISSION TO COMPANY Y
Sequences 13–16: FAX TRANSMISSION TO COMPANY Z

Fig. 11A

AUTOMATION FLOW 27

| SEQUENCE | DESCRIPTION OF PROCESSING |
|---|---|
| 1 | ACTIVATE BROWSER TO ACCESS EWS |
| 2 | INPUTTING ID AND PASSWORD |
| 3 | EXECUTE TIME SYNCHRONIZING PROCESSING WITH NTP SERVER |
| 4 | LOG OUT OF EWS |
| 5 | CLOSE BROWSER |

Fig. 11B

AUTOMATION FLOW 27

| SEQUENCE | DESCRIPTION OF PROCESSING |
|---|---|
| 1 | ACTIVATE BROWSER TO ACCESS EWS |
| 2 | INPUTTING ID AND PASSWORD |
| 3 | DISPLAY OF MESSAGE 「PLEASE SET UP NTP SERVER」 |
| 4 | DISPLAY OF NTP SERVER ADDRESS INPUT SCREEN |
| 5 | DISPLAY OF NTP SERVER PORT DESIGNATED SCREEN |
| 6 | EXECUTE TIME SYNCHRONIZING PROCESSING WITH NTP SERVER |
| 7 | LOG OUT OF EWS |
| 8 | CLOSE BROWSER |

Fig. 11C

AUTOMATION FLOW 27

| SEQUENCE | DESCRIPTION OF PROCESSING |
|---|---|
| 1 | ACTIVATE BROWSER TO ACCESS EWS |
| 2 | INPUTTING ID AND PASSWORD |
| 3 | SELECT 「SETTING INFORMATION PROCESSING TERMINAL TIME」 |
| 4 | LOG OUT OF EWS |
| 5 | CLOSE BROWSER |

Fig. 14

SETTING FILE  25

| No. | SCAN SETTING | FILE NAME | FILE STORAGE LOCATION |
|---|---|---|---|
| 1 | COLOR DOCUMENT, ONE SIDE,··· | Document01.pdf | ¥PC01¥C:¥Document¥ |

Fig. 15

RPA 38

| SEQUENCE | DESCRIPTION OF PROCESSING |
|---|---|
| 1 | OPEN MAIL APPLICATOIN |
| 2 | CREATE NEW MAIL |
| 3 | OPEN ADDRESS BOOK APPLICATION |
| 4 | SELECT DESTINATION ADDRESS |
| 5 | INSERT FIXED FORMAT IN THE SUBJECT AND BODY |
| 6 | SETTING FILE TRANSMISSION |
| 7 | LIBRARY EXECUTION COMMAND |
| 8 | ACCESS TO FILE STORAGE LOCATION |
| 9 | FILE ACQUISITION |
| 10 | ATTACH FILE TO MAIL |
| 11 | EMAL TRANSMISSION |
| 12 | CLOSE MAIL APPLICATION |

Fig. 16

LIBRARY 19

| SEQUENCE | DESCRIPTION OF PROCESSING |
|---|---|
| 1 | SETTING FILE ANALYSIS |
| 2 | SCAN SETTING REFLECTION |
| 3 | DOCUMENT READING START |
| 4 | FILE NAME SETTING |
| 5 | ACCESS TO FILE STORAGE LOCATION |
| 6 | SAVE FILE |
| 7 | END NOTIFICATION TRANSMISSION |

Fig. 18

AUTOMATION FLOW 27

| SEQUENCE | DESCRIPTION OF PROCESSING |
|---|---|
| 1 | ACCESS TO STORAGE AREA WHERE FILE IS SAVED |
| 2 | INPUTTING ID AND PASSWORD |
| 3 | COPY FILE TO FILE STRAGE LOCATION |
| 4 | DELETE FILE IN STORAGE AREA |

Fig. 22

DIVISION MANAGEMENT INFORMATION 45

| No. | USER NAME | JOB NAME | DIVISION FILE NAME | START PAGE | END PAGE | PATH TO STORAGE LOCATION |
|---|---|---|---|---|---|---|
| 1 | yamada | RPA_Scan01 | Scan01_001.pdf | 1 | 127 | ¥MFP¥BOX¥Scandata |
| 2 | yamada | RPA_Scan01 | Scan01_002.pdf | 128 | 243 | ¥MFP¥BOX¥Scandata |
| 3 | yamada | RPA_Scan01 | Scan01_003.pdf | 244 | 285 | ¥MFP¥BOX¥Scandata |

Fig. 23

AUTOMATION FLOW  27

| SEQUENCE | DESCRIPTION OF PROCESSING |
|---|---|
| 1 | ACTIVATE PDF COMBINING APPLICATION |
| 2 | ACCESS TO FILE STORAGE LOCATION |
| 3 | OPEN Scan01_001.pdf |
| 4 | COMBINE Scan01_002.pdf AFTER Scan01_001.pdf |
| 5 | SAVE COMBINED FILE AS Scan01.pdf TO FILE STORAGE LOCATION |
| 6 | COMBINE Scan01_003.pdf AFTER Scan01_001.pdf |
| 7 | OVERWRITE AND SAVE Scan01.pdf |
| 8 | DELETE Scan01_001.pdf |
| 9 | DELETE Scan01_002.pdf |
| 10 | DELETE Scan01_003.pdf |
| 11 | CLOSE PDF COMBINING APPLICATION |

Fig. 24

PROCESSING SEQUENCE DESCRIBED IN RPA

| SEQUENCE | DESCRIPSION OF PROCESSING |
|---|---|
| 1 | ACTIVATE FAX TRANSMISSION APPLICATION |
| 2 | WAIT UNTIL DESIGNATED TRANSMISSION TIME |
| 3 | TRANSMISSION TARGET FILE OPEN |
| 4 | FAX NUMBER SETTING |
| 5 | FAX TRANSMISSION START |
| 6 | TRANSMISSION TARGET FILE CLOSE |
| 7 | WAIT UNTIL DESIGNATED TRANSMISSION TIME |
| 8 | TRANSMISSION TARGET FILE OPEN |
| 9 | FAX NUMBER SETTING |
| 10 | FAX TRANSMISSION START |
| 11 | TRANSMISSION TARGET FILE CLOSE |
| 12 | WAIT UNTIL DESIGNATED TRANSMISSION TIME |
| 13 | TRANSMISSION TARGET FILE OPEN |
| 14 | FAX NUMBER SETTING |
| 15 | FAX TRANSMISSION START |
| 16 | TRANSMISSION TARGET FILE CLOSE |
| 17 | END OF FAX TRANSMISSION APPLICATION |

Sequences 2–6: FAX TRANSMISSION TO COMPANY X
Sequences 7–11: FAX TRANSMISSION TO COMPANY Y
Sequences 12–16: FAX TRANSMISSION TO COMPANY Z

IMAGE PROCESSING APPARATUS, IMAGE PROCESSING SYSTEM, CONTROL METHOD, AND NON-TRANSITORY COMPUTER-READABLE RECORDING MEDIUM

CROSS REFERENCE TO RELATED APPLICATIONS

Japanese Patent Application No. 2023-023552 filed on Feb. 17, 2023 including description, claims, drawings, and abstract the entire disclosure is incorporated herein by reference in its entirety.

BACKGROUND

Technical Field

The present invention relates to an Image Processing Apparatus, Image Processing System, Control Method, and Non-Transitory Computer-Readable Recording Medium. In particular, the present invention relates to a technique for causing the image processing apparatus to execute a specific job by executing Robotic Process Automation (RPA) on an information processing terminal.

Description of the Related Art

Conventionally, there has been known a workflow generating apparatus connected to each of an image forming apparatus, a function extension server, and an information processor via a network (for example, Patent Literature 1: JP2020-194201A). The image forming apparatus reads image data. The function extension server extends a function of the image forming apparatus that stores image data in a storage destination. The information processing apparatus instructs an operation of image data. A workflow generation apparatus discussed in Patent Literature 1 collects logs stored in each apparatus, selects an operation flow, and performs machine-learning based on a storage destination of image data and an image feature amount in the selected operation flow to generate a data processing flow.

On the other hand, in recent years, the use of Robotic Process Automation (hereinafter referred to as "RPA") has attracted attention for improving work efficiency (for example, Patent Literature 2: JP2020-3905A). RPA is software in which operation sequence of multiple operations registers in advance and automatically executes the operation sequence registered in advance based on an execution instruction from a user. By registering the operation sequence of the routine work in the RPA in advance, the RPA automatically performs a plurality of operations in order on behalf of the user. Therefore, by using the RPA, it is possible to efficiently, perform routine tasks.

A user can also use the RPA when using an information processing terminal to cause the image processing apparatus such as a Multifunction Peripheral (MFP) to execute a job. For example, as a routine job of a user, an electronic file such as a bill may be transmitted by FAX in accordance with the deadline date and time of each of company X, company Y, and company Z. In this case, a processing sequence (operation sequence) for registering in the RPA in the information processing terminal is, for example, as illustrated in FIG. 24. In a case where the deadline date and time is set in the order of Company X, Company Y, and Company Z, the RPA activates the FAX transmission application in sequence 1. Next, the RPA performs FAX transmission in accordance with the deadline date and time of the company X in sequences 2 to 6. Next, in sequences 7 to 11, the RPA performs FAX transmission in accordance with the deadline date and time of company Y. Next, in sequences 12 to 16, the RPA performs FAX transmission in accordance with the deadline date and time of company Z. Thereafter, the RPA ends the FAX transmission application in sequence 17. By causing the information processing terminal to execute the RPA as illustrated in FIG. 24, the user does not have to manually set the FAX telephone number of each of company X, company Y, and company Z. In addition, the user does not need to manually perform an operation on the transmission target file. Therefore, the RPA can reduce the operation load on the user in performing the routine work.

However, when a user attempts to register a processing sequence in the RPA executed in an information processing terminal in order to perform routine FAX transmission using the image processing apparatus, the amount of description of the processing sequence becomes enormous as the number of FAX transmission destinations increases. Furthermore, generally, when a processing sequence is registered in the RPA, a user registers a processing sequence with the aim of not stopping a series of processes performed during execution of the RPA as much as possible. Therefore, in the RPA, error processing in a case where an error occurs in the image processing apparatus during execution of a job, and the like may be described. In this case, the amount of description of the processing sequence further increases.

If the description amount of the processing sequence registered in the RPA becomes enormous, there is a problem that a storage area of the information processing terminal is pressed. In addition, when the description amounts of the processing sequence registered in the RPA becomes enormous, efficient maintenance cannot be performed at the time of maintenance of the RPA, and there is also a problem in that the work load rather increases. In order to solve these problems, it is desirable to reduce the description amount of the processing sequence of the RPA executed in the information processing terminal.

SUMMARY

The present invention is intended to solve the above-mentioned problems. In other words, the present invention makes it possible to reduce the amount of description of the processing sequence of the RPA executed by the information processing terminal to cause the image processing apparatus to execute a specific job. An aim of the present invention is to provide such an image processing apparatus, an image processing system, a control method, and a non-transitory computer-readable recording medium.

First, the present invention is directed to an image processing apparatus that is communicable with an information processing terminal and that operates based on a command from the information processing terminal when robotic process automation (RPA) for execution of a specific job is being executed in the information processing terminal.

According to an aspect of the image processing apparatus, the image processing apparatus comprises: a storage section configured to store a library programmed in advance so as to sequentially and automatically execute a plurality of processing included in the specific job; and a hardware processor configured to receive an execution command for the library from the information processing terminal, and call and execute the library from the storage section.

Second, the present invention is also directed to an image processing system in which an image processing apparatus and an information processing terminal can communicate with each other.

According to an aspect of the image processing system, the image processing apparatus stores a library programmed in advance so as to sequentially and automatically execute a plurality of processing included in a specific job, and the image processing apparatus receives the execution command, and calls and executes the library.

Third, the present invention is also directed to a control method for an image processing apparatus that can communicate with an information processing terminal and stores a library programmed in advance so as to sequentially and automatically execute a plurality of processing included in a specific job.

According to an aspect of the control method, the control method comprises: when robotic process automation (RPA) for execution of the specific job is being executed in the information processing terminal, receiving an execution command for the library issued by the robotic process automation (RPA); and calling and executing the library based on the execution command.

Fourth, the present invention is also directed to a non-transitory computer-readable recording medium storing a program to be executed in an image processing apparatus being communicable with an information processing terminal and including a storage section that stores a library programmed in advance so as to sequentially and automatically execute a plurality of processing included in a specific job.

According to an aspect of the non-transitory computer-readable recording medium, the program causes a hardware processor of the image processing apparatus to execute: when robotic process automation (RPA) for execution of the specific job is being executed in the information processing terminal, receiving an execution command for the library issued by the robotic process automation (RPA); and calling and executing the library based on the execution command.

BRIEF DESCRIPTION OF THE DRAWINGS

The advantages and features provided by one or more embodiments of the invention will become more fully understood from the detailed description given herein below and the appended drawings which are given by way of illustration only, and thus are not intended as a definition of the limits of the present invention.

FIG. 3 illustrates an example of a setting file;

FIG. 4 illustrates an example of a processing sequence described in a library;

FIG. 6 illustrates an example of RPA executed in an information processing terminal;

FIG. 10 illustrates an example of a processing sequence described in a library;

FIG. 11A, FIG. 11B, and FIG. 11C illustrate an example of an automation flow provided to an information terminal;

FIG. 14 illustrates an example of a setting file;

FIG. 15 illustrates an example of RPA executed in an information processing terminal;

FIG. 16 illustrates an example of a processing sequence described in a library;

FIG. 18 illustrates an example of an automation flow provided to an information processing terminal;

FIG. 22 illustrates an example of the division management information;

FIG. 23 illustrates an automation flow generated by an automation flow creating section; and FIG. 24 illustrates an example of a processing sequence registered in a conventional RPA.

DETAILED DESCRIPTION OF EMBODIMENTS

Figure 1:
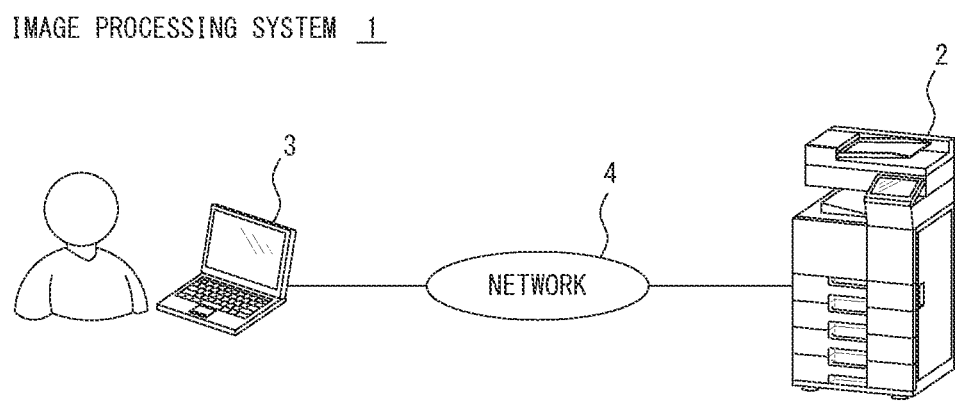
FIG. 1 illustrates an example of one configuration of an image processing system.

Hereinafter, one or more embodiments of the present invention will be described with reference to the drawings. However, the scope of the invention is not limited to the disclosed embodiments.

Preferred embodiments of the present invention will be described below in detail with reference to the drawings. Elements common to each other in the embodiments described below are denoted by the same reference numerals, and redundant description thereof will be omitted.

First Embodiment

A first embodiment of the present invention is described. FIG. 1 illustrates a configuration example of an image processing system 1 in the first embodiment of the present invention. The image processing system 1 includes the image processing apparatus 2, such an MFP, and an information processing terminal 3, such as a personal computer (PC), a tablet terminal, or a smartphone. The image processing system 1 is configured so that the image processing apparatus 2 and the information processing terminal 3 can communicate with each other via a network 4. The network 4 is a network including a local area network (LAN), the Internet, and the like. The communication performed via the network 4 may be either or both of wired communication and wireless communication.

The image processing apparatus 2 has multiple functions including a copy function, a scan function, a print function, and a FAX function. The image processing apparatus 2 executes a job designated by the user. For example, the image processing apparatus 2 communicates with the information processing terminal 3 via the network 4. The image processing apparatus 2 is capable of performing job setting and job execution based on a command received from the information processing terminal 3. For example, when an RPA for causing the image processing apparatus 2 to execute a specific job is being executed in the information processing terminal 3, the image processing apparatus 2 receives a command issued by the RPA from the information processing terminal 3 and executes processing corresponding to the command. Therefore, the user can cause the image processing apparatus 2 to automatically execute the designated job without performing an operation on the image processing apparatus 2 by causing the information processing terminal 3 of the user to execute the RPA.

Figure 2:
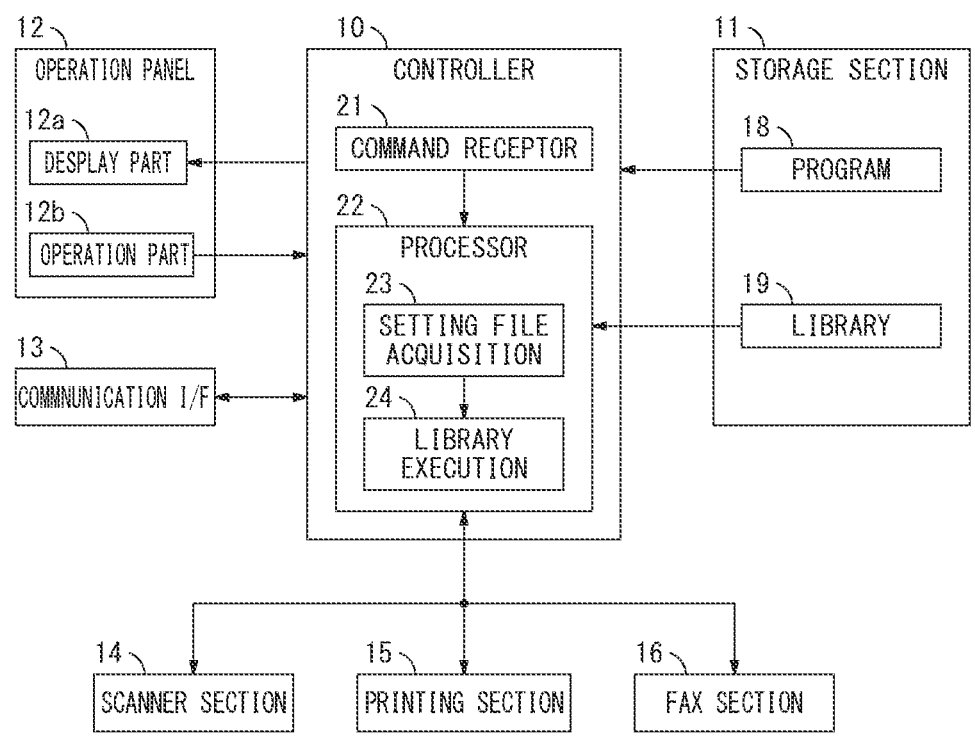
FIG. 2 is a block diagram illustrating an example of a hardware configuration and a functional configuration of an image processing apparatus.

FIG. 2 is a block diagram illustrating an example of a hardware configuration and a functional configuration of the image processing apparatus 2. The image processing apparatus 2 includes, as its hardware configuration, a controller 10, a storage section 11, an operation panel 12, a communication interface 13, a scanner section 14, a printing section 15, and a FAX section 16. The controller 10 includes a processor and a memory (not illustrated), and controls the operation of each section. The storage section 11 is a nonvolatile storage device including, for example, such as a hard disk drive (HDD) or a solid state drive (SSD). The operation panel 12 is a user interface including a display part 12a and an operation part 12b. The display part 12a includes, for example, a color liquid crystal display, and displays various operation screens. The operation part 12b includes, for example, a touch screen key, and receives an operation by a user. The communication interface 13 is for connecting the image processing apparatus 2 to the network 4 for communication. The communication interface 13 includes, for example, a network interface card (NIC). The scanner section 14 optically reads an image of a document set by a user to generate image data. The printing section 15 prints and outputs an image on a sheet such as a printing sheet based on image data to be printed. The FAX section 16 transmits and receives FAX data via a public telephone network (not illustrated).

The storage section 11 stores a program 18 to be executed by the processor of the controller 10. In addition, the storage section 11 stores a library 19 programmed in advance so as to sequentially and automatically execute a plurality of processing included in a specific job. The library 19 is software component that is called and executed by the program 18 when the program 18 is being executed by the processor. The storage section 11 stores multiple libraries 19 in advance according to the type of job.

The controller 10 functions as a command receptor 21 and a processor 22 by the processor executing the program 18.

The command receptor 21 receives a command received from the operation panel 12 or the communication interface 13. For example, when a user operates the operation panel 12, the command receptor 21 receives the user's operation on the operation panel 12 as a command. When a user remotely operates the image processing apparatus 2 via the information processing terminal 3, the command receptor 21 receives a command transmitted from the information processing terminal 3. Furthermore, when the RPA for causing the image processing apparatus 2 to execute a specific job is being executed in the information processing terminal 3, the command receptor 21 receives a command that is automatically issued by the RPA and transmitted from the information processing terminal 3. Upon receiving a command, the command receptor 21 causes the processor 22 to function.

The processor 22 executes processing based on the command received by the command receptor 21. When the command received by the command receptor 21 is a setting command for one setting item among a plurality of setting items, the processor 22 performs setting for a designated setting item based on the command. When the command received by the command receptor 21 is a command to start execution of a job, the processor 22 drives each of the scanner section 14, the printing section 15, and the FAX section 16 to control execution of the job.

For example, when the command received by the command receptor 21 is a fax number setting command, the processor 22 sets a designated fax number in the setting item for a FAX transmission destination. When the command received by the command receptor 21 is a command to set FAX transmission details with an attached electronic file, the processor 22 sets the electronic file attached to the setting command as FAX transmission details. Furthermore, when the command received by the command receptor 21 is a fax transmission start command, the processor 22 drives the FAX section 16 to start executing a FAX transmission job. As described above, the processor 22 executes one processing corresponding to the command received by the command receptor 21.

The processor 22 includes a setting file acquisition 23 and a library execution 24. The setting file acquisition 23 receives and acquires a setting file 25 transmitted from the information processing terminal 3. When the command received by the command receptor 21 is an execution command of the library 19, the library execution 24 reads the library 19 designated by the execution command from the storage section 11 and executes the library 19. As described above, the library 19 is programmed in advance so as to sequentially and automatically execute a plurality of processing included in a specific job. Therefore, when the execution command of the library 19 is received by the command receptor 21, the library execution 24 can sequentially and automatically execute a plurality of processing based on the execution command. At this time, the library execution 24 executes the library 19 in a state in which the setting for each of the multiple processing is reflected based on the setting file 25 acquired by the setting file acquisition 23.

FIG. 3 illustrates an example of a setting file 25. FIG. 3 illustrates the setting file 25 of a job for FAX transmission of an electronic file such as a bill in accordance with the deadline date and time of each of company X, company Y, and company Z as a routine work. In the setting file 25, a FAX number, a transmission target file, and a designated transmission time are set for each of company X, company Y, and company Z. In the field of the transmission target file, a path to the transmission target file and a file name of the transmission target file are described so that the image processing apparatus 2 can automatically acquire the transmission target file. The library execution 24 executes the library 19 based on the setting file 25 and thus sequentially executes processing for transmitting a FAX to each of company X, company Y, and company Z.

FIG. 4 illustrates an example of processing sequence described in the library 19. When starting the execution of the library 19, the library execution 24 first analyzes the setting file 25 as sequence 1. Through this analysis, the library execution 24 analyzes the setting file 25 in FIG. 3. As a result, the library execution 24 specifies that the number of FAX transmission destinations is three, and the FAX transmission order is the order of Company X, Company Y, and Company Z. Next, in sequence 2, the library execution 24 waits until the designated transmission time for company X is reached. At the designated transmission time for the company X, the library execution 24 acquires a transmission target file of the company X based on the setting file 25 as sequence 3. That is, the library execution 24 accesses the storage location of the transmission target file based on the path designated by the setting file 25, and acquires the transmission target file from the storage location. Next, the library execution 24 sets the FAX number of the company X as sequence 4. Thereafter, the library execution 24 starts FAX transmission to the company X as sequence 5. Thus, the FAX transmission to the company X is automatically performed.

Next, the library execution 24 performs sequences 6 to 9, and performs FAX transmission to Company Y. Sequences 6 to 9 are sequences similar to the sequences 2 to 5, and are processing in which a transmission destination, a designated transmission time, and a transmission target file are different. The library execution 24 can automatically perform the FAX transmission to the company Y by executing the processing of the sequences 6 to 9 of the library 19.

Next, the library execution 24 performs sequences 10 to 13 to perform FAX transmission to Company Z. Sequences 10 to 13 are sequences similar to sequences 2 to 5, and are processing in which a transmission destination, a designated transmission time, and a transmission target file are different. The library execution 24 can automatically perform FAX transmission to the Z company by executing the processing of the sequences 10 to 13 of the library 19. Finally, as sequence 14, the library execution 24 transmits an end notification of the library 19 to the information processing terminal 3.

As described above, the library execution 24 sequentially and automatically executes a plurality of processing programmed in the library 19 in advance. Thus, the library execution 24 can individually perform automatic transmission of a FAX to a plurality of transmission destinations designated in the setting file 25.

Figure 5:
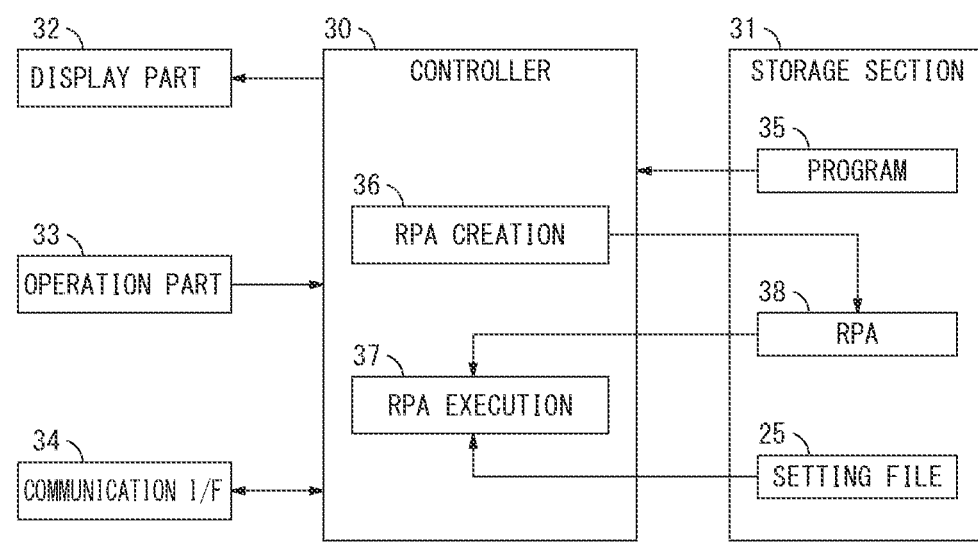
FIG. 5 is a block diagram illustrating an example of a hardware configuration and a functional configuration of an information processing terminal.

Next, FIG. 5 is a block diagram illustrating an example of a hardware configuration and a functional configuration of the information processing terminal 3. The information processing terminal 3 includes, as its hardware configuration, a controller 30, a storage section 31, a display part 32, an operation part 33, and a communication interface 34. The controller 30 includes a processor and a memory (not illustrated) and controls the operation of each part. The storage section 31 is a nonvolatile storage device which is configured of, for example, such as a hard disk drive (HDD) and a solid state drive (SSD). The display part 32 is configured of, for example, a color liquid crystal display. The display part 32 displays various operation screens which can be operated by a user. The operation part 33 is configured of, for example, a keyboard, a pointing device, and touch screen keys. The operation part 33 receives an operation by a user. The communication interface 34 is for performing communication by connecting the information processing terminal 3 to the network 4, and is configured of, for example, a network interface card (NIC).

The storage section 31 stores a program 35 to be executed by the processor of the controller 30. Further, the storage section 31 stores an RPA 38 created by an RPA creation 36, and stores the setting file 25 created by the user.

The controller 30 functions as the RPA creation 36 and an RPA execution 37 by the processor reading and executing the program 35.

The RPA creation 36 creates the RPA 38 describing an operation sequence of a plurality of operations. The RPA creation 36 operates based on an RPA creation instruction from a user. The RPA creation 36 sequentially records user operations performed on the information processing terminal 3 in the operation sequence. When the end of the RPA creation is instructed by the user, the RPA creation 36 creates the RPA 38 based on the operation sequence recorded so far, and stores it in the storage section 31.

The RPA execution 37 reads and executes the RPA 38 stored in the storage section 31. The RPA execution 37 operates based on an RPA execution instruction from a user. The RPA execution 37 reads and executes the RPA 38 designated by the user from the storage section 31. Thus, the RPA execution 37 automatically performs a plurality of operations in order based on the operation sequence described in the RPA 38.

When the sequence described in the RPA 38 includes an operation for transmitting the setting file 25 in the storage section 31 to the image processing apparatus 2, the RPA execution 37 reads the setting file 25 from the storage section 31 and transmits the setting file 25 to the image processing apparatus 2. Furthermore, when the sequence described in the RPA 38 includes an operation for causing the image processing apparatus 2 to execute the library 19, the RPA executing 37 designates the library 19 to be executed and transmits a command to execute the library 19 to the image processing apparatus 2.

FIG. 6 illustrates an example of the RPA 38 performed in the information processing terminal 3. In this RPA 38, sequence for causing the image processing apparatus 2 to execute a FAX transmission job is described. When the RPA execution 37 executes the RPA 38, as sequence 1, the RPA execution 37 activates a FAX transmission application such as a FAX transmission driver in the data processing terminal 3. When the FAX transmission application is activated in the information processing terminal 3, the information processing terminal 3 accesses the image processing apparatus 2 and enters a state in which it can communicate with the image processing apparatus 2. Next, as sequence 2, the RPA execution 37 causes the FAX transmission application to perform processing for transmitting the setting file 25 to the image processing apparatus 2. Thus, the setting file 25 is automatically transmitted to the image processing apparatus 2 by the RPA 38. Next, as sequence 3, the RPA execution 37 causes the FAX transmission application to perform processing of transmitting an execution command of the library 19 to the image processing apparatus 2. This execution command includes a designation of the library 19 to be executed. Finally, the RPA execution 37 terminates the FAX transmission application as sequence 4. The RPA execution 37 may execute the sequence 4 when receiving an end notification from the image processing apparatus 2.

When the RPA 38 as described above is executed in the information processing terminal 3, the image processing apparatus 2 receives the setting file 25 and a command to execute the library 19 from the information processing terminal 3. Therefore, the image processing apparatus 2 executes the library 19 described above based on a command issued by the RPA 38, and can individually transmit the transmission target file to each of company X, company Y, and company Z at a designated time.

The image processing system 1 of the present embodiment can cause the image processing apparatus 2 to individually execute a FAX transmission job for each of Company X, Company Y, and Company Z simply by describing the four sequences of sequences 1 to 4 as illustrated in FIG.

6 in the RPA 38 created in the information processing terminal 3. That is, it is not necessary to describe sequences 1 to 17 in the RPA 38 as in the conventional art illustrated in FIG. 24. Therefore, it is possible to reduce the amount of description of a processing sequence in the RPA 38 of the information processing terminal 3 as compared with conventional cases. Thus, the information processing terminal 3 can prevent the storage area of the storage section 31 from being pressed by RPA 38. In addition, since the number of processing sequence described in the RPA 38 is smaller than that in the conventional art when maintenance of the RPA 38 is performed after the RPA 38 is created, there is also an advantage in that maintenance work can be efficiently performed.

Figure 7:
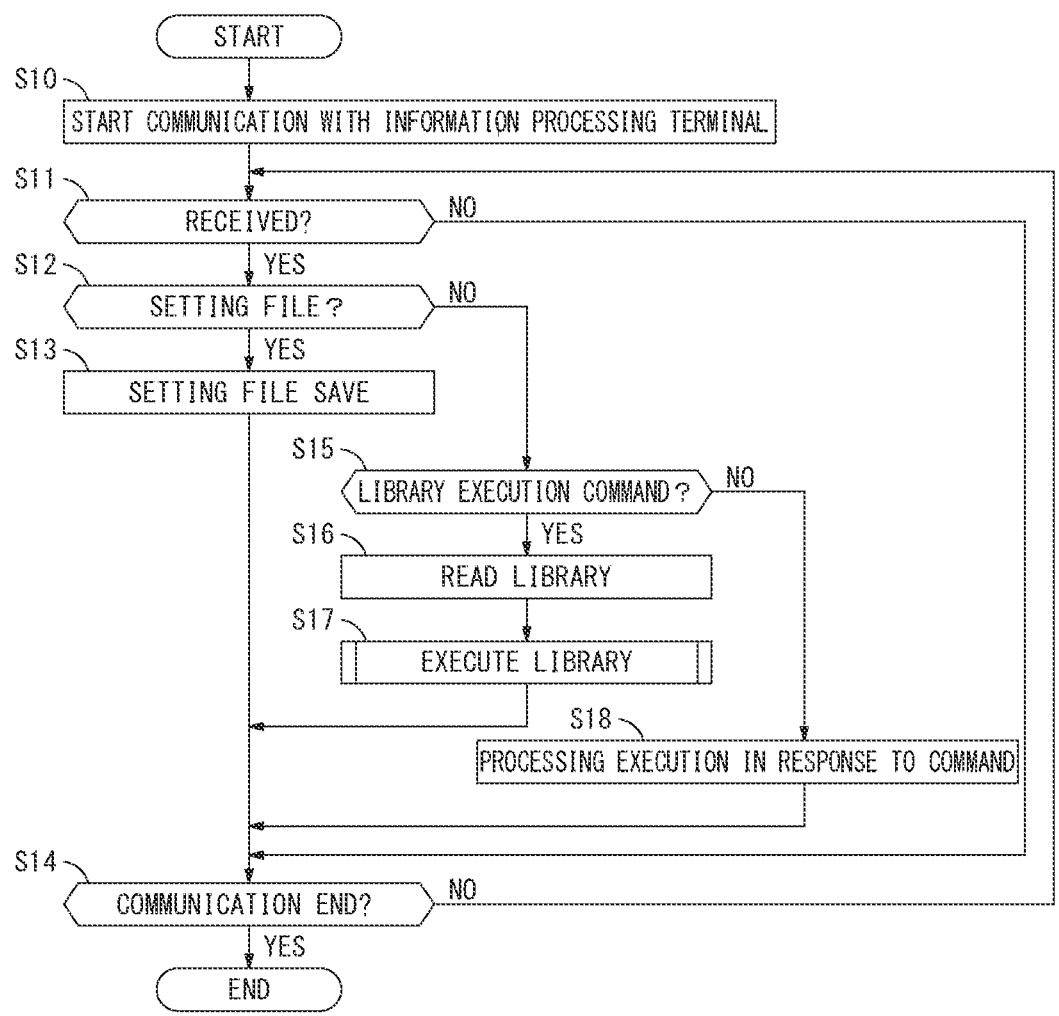
FIG. 7 is a flowchart illustrating an example of a processing sequence performed by the image processing apparatus.
Figure 8:
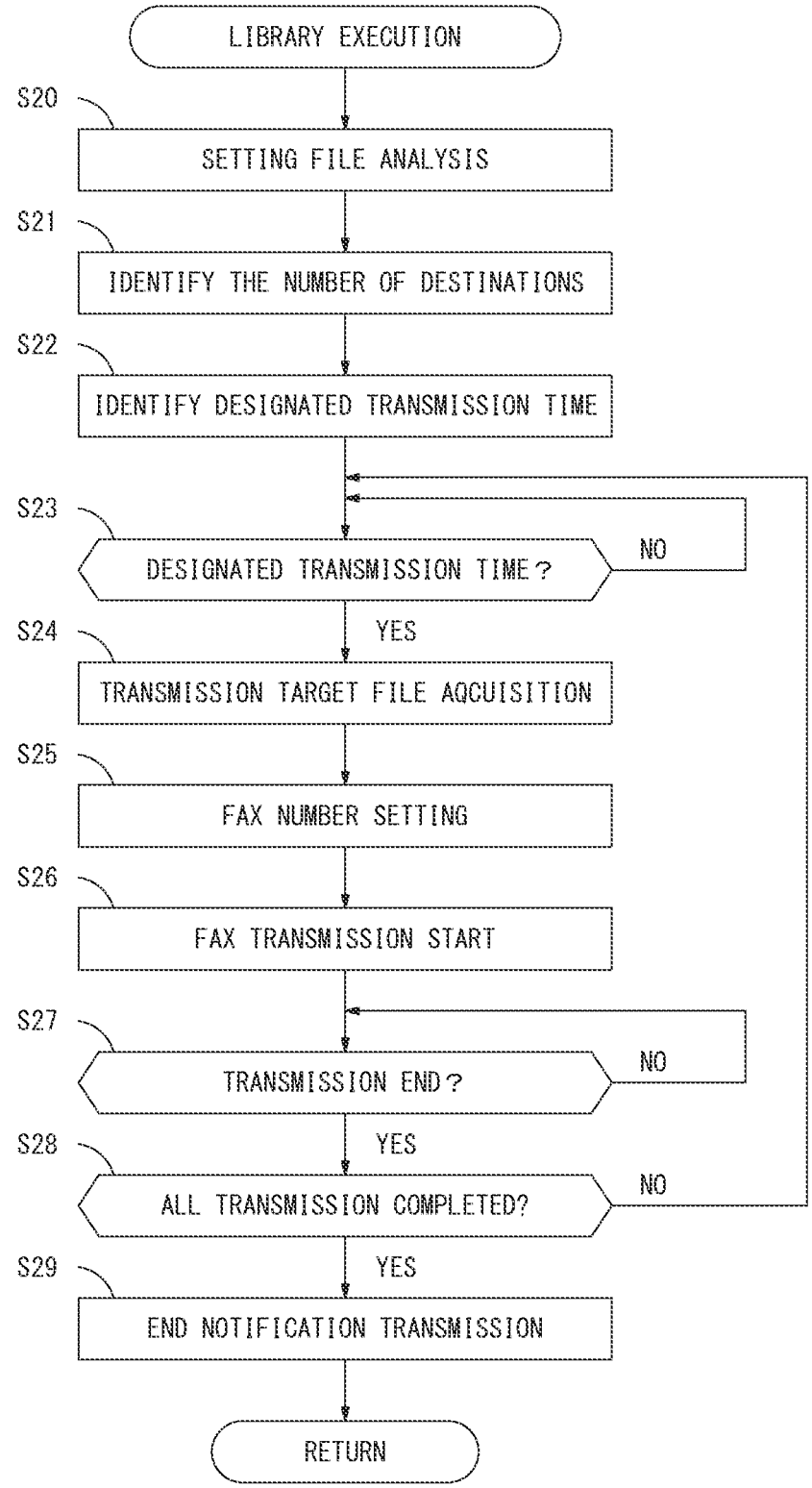
FIG. 8 is a flowchart illustrating a processing sequence based on a library.

Next, an example of operation of the image processing apparatus 2 will be described. FIGS. 7 and 8 are flowcharts illustrating an example of a processing sequence performed by the image processing apparatus 2. FIG. 7 illustrates a main processing sequence performed by the controller 10 of the image processing apparatus 2, and illustrates a processing sequence based on the program 18. FIG. 8 illustrates a processing sequence based on the library 19.

First, as illustrated in FIG. 7, controller 10 starts communication with the information processing terminal 3 (step S10). That is, when the FAX transmission application is activated in the information processing terminal 3, the image processing apparatus 2 is accessed from the information processing terminal 3. The controller 10 starts communication with the information processing terminal 3 in response to detection of access from the information processing terminal 3.

Upon starting communication with the terminal 3, the controller 10 determines whether any information has been received from the terminal 3 (step S11). When information has been received (YES in step S11), the controller 10 determines whether or not the information received from the information processing terminal 3 is the setting file 25 (step S12). When the received information is the setting file 25 (YES in step S12), the controller 10 stores the setting file 25 in a predetermined storage area of the storage section 11 (step S13).

When the received information is not the setting file 25 (NO in step S12), the controller 10 determines whether or not the received information is a library execution command (step S15). When the received information is a library execution command (YES in step S15), the controller 10 reads the library 19 designated by the library execution command from the storage section 11 (step S16), and executes the read library 19 (step S17). Thus, the controller 10 sequentially and automatically executes multiple processing according to the processing sequence described in the library 19.

When the received information is also not a library execution command (NO in step S15), the controller 10 executes processing corresponding to the command received from the information processing terminal 3 (step S18). For example, if the received command is a setting command for one setting item among a plurality of setting items, the controller 10 performs setting for the designated setting item based on the setting command.

The controller 10 determines whether or not communication with the information processing terminal 3 has been completed (step S14). For example, when the FAX transmission application is ended in the information processing terminal 3, the communication state is disconnected by the information processing terminal 3. Therefore, the controller 10 determines that the communication with the information processing terminal 3 has been completed. When the communication with the information processing terminal 3 is not ended (NO in step S14), the controller 10 repeatedly executes the processing in and after step S11. In this case, every time the controller 10 receives information from the information processing terminal 3, the controller 10 executes processing corresponding to the received information. When the communication with the information processing terminal 3 completes, the controller 10 ends the processing based on the program 18.

Next, a detailed processing sequence of the library execution (step S17) will be described with reference to FIG. 8. When the execution of the library 19 is started, the controller 10 reads the setting file 25 stored in the storage section 11 and analyzes the setting file 25 (step S20). The controller 10 identifies the number of FAX transmission destinations based on the analysis result of the setting file 25 (step S21). Further, the controller 10 identifies the designated transmission time for each transmission destination (step S22). Thus, the controller 10 can determine the transmission order of FAX to a plurality of transmission destinations.

Thereafter, the controller 10 stands by until the current time becomes the designated transmission time defined in the setting file 25 (step S23). When the designated transmission time comes (YES in step S23), the controller 10 acquires a transmission target file based on the setting file 25 (step S24), and sets a FAX number (step S25). When the FAX transmission is ready, the controller 10 starts the FAX transmission (step S26). When the fax transmission is completed (YES in step S27), the controller 10 determines whether or not FAX transmission to all the transmission destinations designated in the setting file 25 has been completed (step S28). When the FAX transmission to all the transmission destinations is not completed (NO in step S28), the controller 10 repeatedly executes the processing in and after step S23. Therefore, by executing the library 19, the image processing apparatus 2 can perform FAX transmission individually to each of the multiple transmission destinations set in the setting file 25.

On the other hand, when the FAX transmission to all the transmission destinations is completed (YES in step S28), the controller 10 transmits an end notification to the information processing terminal 3 (step S29). Since the end notification is transmitted from the image processing apparatus 2 to the information processing terminal 3, the information processing terminal 3 can recognize that the FAX transmission to multiple transmission destinations has been normally completed. Therefore, the information processing terminal 3 can terminate the FAX transmission application based on the end notification transmitted from the image processing apparatus 2.

As described above, the image processing apparatus 2 of the present embodiment can communicate with the information processing terminal 3. While the RPA 38 for executing a specific job is being executed in the information processing terminal 3, the image processing apparatus 2 receives a command issued by the RPA 38 and performs an operation in accordance with the command. The image processing apparatus 2 stores the library 19 that is programmed in advance so as to sequentially and automatically execute a plurality of processing included in a specific job. Upon receiving a command to execute the library 19 from the information processing terminal 3, the image processing apparatus 2 calls and executes the designated library 19. That is, upon start of execution of the library 19, the image processing apparatus 2 can execute a plurality of processing programmed in the library 19 sequentially and automatically without any command from the information processing terminal 3. Therefore, when creating the RPA 38 in the information processing terminal 3, the user can minimize the description amount of the processing sequence to be registered in the RPA 38. As a result, it has an advantage of avoiding the RPA 38 from oppressing the storage area of the information processing terminal 3, as well as making it easier for the users to manage RPA 38.

Second Embodiment

Next, the second embodiment of the present invention is described. The present embodiment describes an example in which the controller 10 of the image processing apparatus 2 executes the library 19 to provide an automation flow to the information processing terminal 3. The automation flow is software that defines a sequence of multiple processing. Since the image processing apparatus 2 provides the automation flow to the information processing terminal 3, it is possible to cause the information processing terminal 3 to execute a processing sequence that is being executed in the information processing terminal 3 and is not described in the RPA 38.

Figure 9:
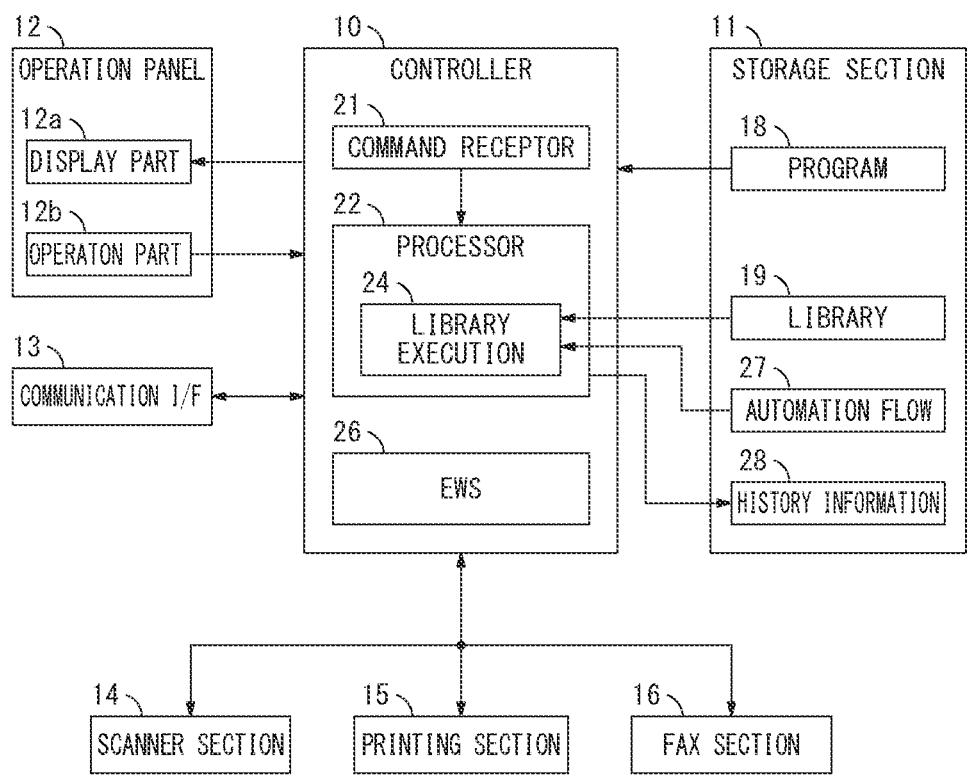
FIG. 9 is a block diagram illustrating an example of a hardware configuration and a functional configuration of an image processing apparatus in the second embodiment.

FIG. 9 is a block diagram illustrating an example of a hardware configuration and a functional configuration of the image processing apparatus 2 according to the second embodiment. The image processing apparatus 2 further functions as an Embedded Web Server (EWS) 26 in addition to the command receptor 21 and the processor 22 described in the first embodiment by the processor of the controller 10 executing the program 18. EWS 26 is a web server which provides an interface for an external apparatus to perform various settings and management of the image processing apparatus 2, and provides a web page for various settings and management to the outside when an access from the outside is detected. The setting file acquisition 23 of the processor 22 is not illustrated.

Furthermore, in addition to the program 18 and the library 19 described above, the image processing apparatus 2 further stores an automation flow 27 and history information 28 in the storage section 11.

The history information 28 is information in which an execution history of a job in the image processing apparatus 2 is recorded. For example, the execution time of the job is recorded in the history information 28. That is, when the processor 22 executes the job designated by the user, the processor 22 records the time indicated by the internal clock of the image processing apparatus 2 in the history information 28 as the execution time of the job. Therefore, the accuracy of the execution time of the job recorded in the history information 28 is derived from the accuracy of the internal clock of the image processing apparatus 2. When the internal clock does not indicate an accurate time, the execution time of the job recorded in the history information 28 also becomes an inaccurate time, and correct history management cannot be performed. Therefore, the image processing apparatus 2 preferably performs a processing of synchronizing the internal clock with the accurate time before starting the execution of the job.

When the library 19 is executed in the controller 10, the image processing apparatus 2 of the present embodiment executes a processing of correctly adjusting the time of the internal clock by the function of the library 19. At this time, the controller 10 transmits the automation flow 27 to the information processing terminal 3 based on the sequence described in the library 19, and causes the information processing terminal 3 to automatically execute the processing sequence based on the automation flow 27. For example, the automation flow 27 of the present embodiment describes a processing sequence for causing the information processing terminal 3 to activate a browser and to access the EWS 26 from that browser to adjust an internal clock. Therefore, when the data processing terminal 3 receives the automation flow 27 from the image processing apparatus 2, the data processing terminal 3 automatically executes the processing sequence described in the automation flow 27, accesses the EWS 26 of the image processing apparatus 2, and automatically adjusts the time of the internal timepiece.

FIG. 10 illustrates an example of a processing sequence described in the library 19 of the present embodiment. The different point between the library 19 processing sequence and the library 19 processing sequence illustrated in FIG. 4 are sequence 1, sequence 7, sequence 12 and sequence 17.

Sequence 1 is sequence for performing the time synchronization processing to adjust the internal clock of the image processing apparatus 2. The library execution 24 reads the automation flow 27 stored in advance in the storage section 11 and transmits the automation flow 27 to the information processing terminal 3 along with the execution of the processing of the sequence 1, and causes the information processing terminal 3 to execute the processing sequence of a plurality of processing described in the automation flow 27. As a result, the information processing terminal 3 accesses the EWS 26 of the image processing apparatus 2 and adjusts the time of the internal clock of the image processing apparatus 2 to the accurate time.

In addition, sequence 7, sequence 12, and sequence 17 are processing of recording the execution history of the job indicating that the FAX transmission is performed in the history information 28 after the library execution 24 performs the FAX transmission. When the processing of sequence 7, sequence 12, and sequence 17 are performed, the adjustment processing for the internal clock of the image processing apparatus 2 has already been completed, and thus a correct time is recorded as the execution time of the job in the history information 28.

FIG. 11A, FIG. 11B, and FIG. 11C illustrate the automation flow 27 provided to the information processing terminal 3. FIG. 11A, FIG. 11B, and FIG. 11C illustrate three automation flows 27.

The automation flow 27 illustrated in FIG. 11A includes sequences 1 to 5. Sequence 1 is processing of activating the browser and accessing the EWS 26 of the image processing apparatus 2. Sequence 2 is processing of inputting an ID and a password for logging in to the EWS 26. By describing information on the ID and the password in the automation flow 27 in advance, the information processing terminal 3 can automatically input the ID and the password. Sequence 3 is processing in which EWS 26 is made to access a network time protocol (NTP) server, correct time information provided by the NTP server is acquired, and the time of an internal clock is synchronized with the NTP server. Sequence 4 is processing for logging out from the EWS 26. Sequence 5 is processing for closing and ending the browser. The image processing apparatus 2 can synchronize the time of the internal clock with the time of the NTP server by causing the information processing terminal 3 to execute the automation flow 27 illustrated in FIG. 11A.

The automation flow 27 illustrated in FIG. 11B is, for example, a flow performed when the adjustment of the time fails in the automation flow 27 illustrated in FIG. 11A, and includes sequences 1 to 8. Sequence 1 is processing of activating the browser and accessing the EWS 26 of the image processing apparatus 2. Sequence 2 is processing of inputting an ID and a password for logging in to the EWS 26. Sequence 3 is processing of displaying a message "Please set NTP server" on the screen of the browser. Sequence 4 is processing of displaying an address input screen of the NTP server on the screen of the browser. The user manually inputs the address of the NTP server in the address input screen. Sequence 5 is processing for displaying the port designation screen of the NTP server on the screen of the browser. The user manually designates a port of the NTP server on the port designation screen. Sequence 6 is processing of causing the EWS 26 to access the NTP server, acquiring correct time information provided by the NTP server, and synchronizing the time of the internal clock with the NTP server. Sequence 7 is processing for logging out from the EWS 26. Sequence 8 is processing for closing the browser and ending the processing. The image processing apparatus 2 can cause the information processing terminal 3 to execute the automation flow 27 illustrated in FIG. 11B to synchronize the time of the internal clock with the time of the NTP server specified by the user.

The automation flow 27 illustrated in FIG. 11C is, for example, a flow performed when the adjustment of the time fails in the automation flow 27 illustrated in FIG. 11B, and includes sequences 1 to 5. Sequence 1 is processing of activating the browser and accessing the EWS 26 of the image processing apparatus 2. Sequence 2 is processing of inputting an ID and a password for logging in to the EWS 26. Sequence 3 is processing of selecting "set the time of the information processing terminal 3" on the EWS 26 setting screen. By this processing, the time of the internal clock of the image processing apparatus 2 is synchronized with the time of the information processing terminal 3. Sequence 4 is processing for logging out from the EWS 26. Sequence 5 is processing for closing and ending the browser.

Figure 12:
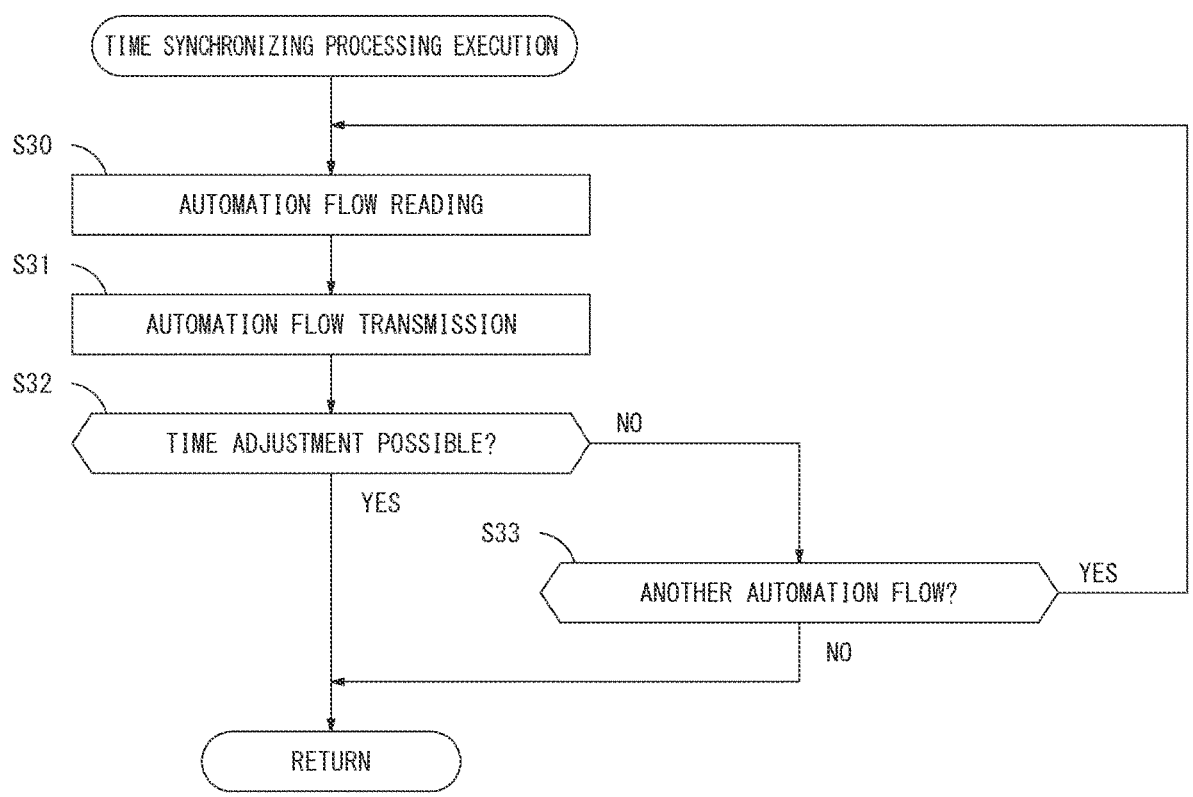
FIG. 12 is a flowchart illustrating an example of a processing sequence performed when time synchronization processing is executed.

FIG. 12 is a flowchart illustrating an example of a processing sequence performed by the time synchronization processing execution in the sequence 1 of the library 19. When starting this processing, the library execution 24 reads the automation flow 27 from the storage section 11 (step S30). Next, the library execution 24 transmits the automation flow 27 to the information processing terminal 3 (step S31). The library execution 24 determines whether or not the time adjustment of the internal clock can be performed by the automation flow 27 transmitted to the information processor 3 (step S32). In a case where the time is not adjusted (NO in step S32), the library execution 24 determines whether or not another automation flow 27 is present (step S33). In a case where there is another automation flow 27 (YES in step S33), the library execution 24 executes the processing after step S30 again, and transmits another automation flow 27 to the information processing terminal 3. When the time adjustment has been performed (YES in step S32), or when there is no other automation flow 27 (NO in step S33), the library execution 24 ends the processing of sequence 1.

The controller 10 executes the library 19 to perform the above-described processing, and thus can cause the information processing terminal 3 to automatically perform a series of multiple processing that are not included in the RPA 38. Therefore, it is not necessary to describe the sequence of the automation flow 27 in the RPA 38 in advance, and the amount of description of the processing sequence in the RPA 38 can be reduced. Therefore, similarly to the first embodiment, the image processing apparatus 2 of the present embodiment does not needs to include the processing sequence described in the automation flow 27 in the processing sequence of the RPA 38 when the RPA 38 is created in the information process terminal 3.

In particular, even when a user does not know an operation sequence for adjusting the internal clock of the image processing apparatus 2, the information processing terminal 3 can adjust the internal clock of the image processing apparatus 2 by executing the automation flow 27 provided from the image processing apparatus 2.

When executing the automation flow 27 received from the image processing apparatus 2, the information processing terminal 3 may temporarily suspend the execution of the RPA 38 and execute the processing sequence described in the automation flow 27. In addition, the information processing terminal 3 may execute the processing sequence described in the automation flow 27 in parallel with the execution of the RPA 38.

The configuration and operation of this embodiment other than the points described above are the same as those described in the first embodiment.

Third Embodiment

Next, the third embodiment of the present invention is described. The image processing apparatus 2 described in the second embodiment provides the automation flow 27 stored in advance in the storage section 11 to the information processing terminal 3, and causes the information processing terminal 3 to automatically execute the processing sequence described in the automation flow 27. On the other hand, in the present embodiment, a description will be given of an example in which, if an error occurs when a specific job is being executed in the image processing apparatus 2, the image processing apparatus 2 generates an automation flow 27 for coping with the error and provides the automation flow 27 to the information processing terminal 3.

Figure 13:
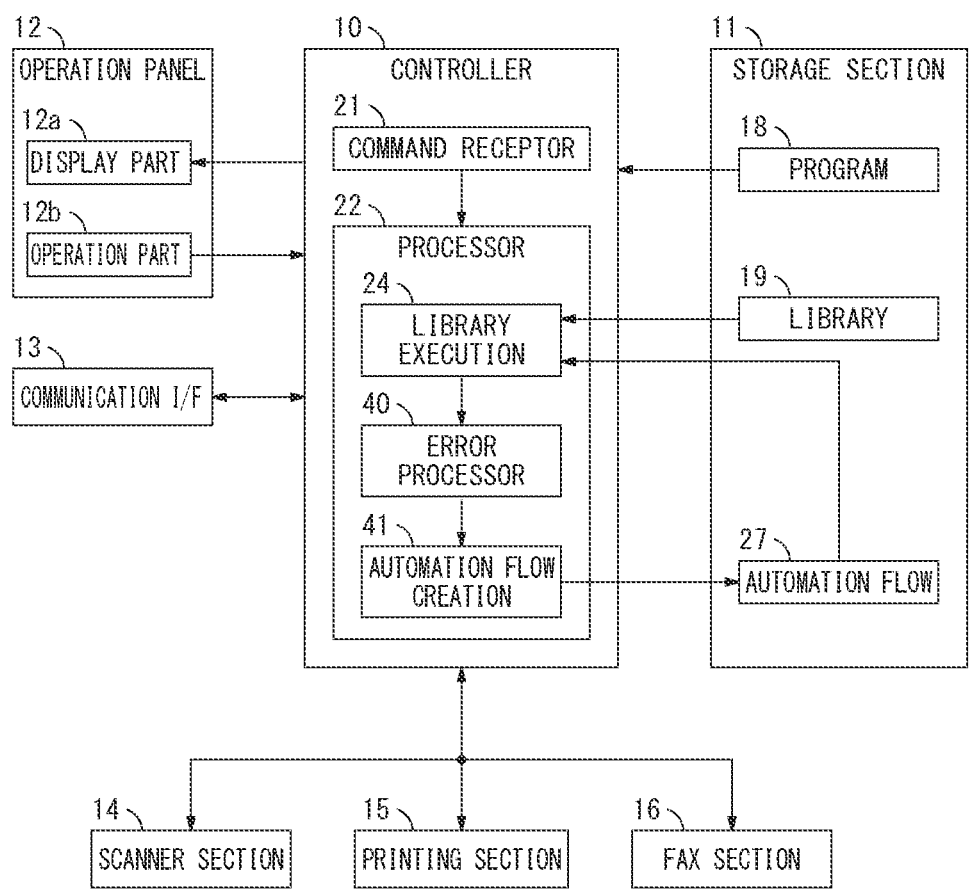
FIG. 13 is a block diagram illustrating an example of a hardware configuration and a functional configuration of an image processing apparatus in the third embodiment.

FIG. 13 is a block diagram illustrating an example of a hardware configuration and a functional configuration of the image processing apparatus 2 according to the third embodiment. The image processing apparatus 2 functions as the command receptor 21 and the processor 22 as in the first embodiment by the processor of the controller 10 executing the program 18.

The processor 22 includes the library execution 24, an error processor 40, and an automation flow creation 41. The setting file acquisition 23 of the processor 22 is not illustrated.

When the library execution 24 sequentially and automatically executes multiple processing included in the library 19, an error may occur in the image processing apparatus 2. When an error occurs during execution of one of the multiple processing included in the library 19, the library execution 24 cannot continue the subsequent processing. Therefore, in a case where the library execution 24 detects that an error has occurred during the execution of the library 19, the library execution 24 causes the error processor 40 to function.

In response to an error that has occurred in the image processing apparatus 2, the error processor 40 automatically executes processing for dealing with the error. For example, the error processor 40 automatically executes processing for avoiding an error that has occurred in the image processing apparatus 2. When the error processor 40 performs the processing for coping with the error, a processing different from the processing defined in the library 19 is performed. For that reason, there is a possibility that the information processing terminal 3 executing RPA 38 cannot normally perform the subsequent processing described in the RPA 38.

Therefore, when the processing for coping with the error is automatically executed by the error processor 40, the automation flow creation 41 functions. The automation flow creation 41 generates the automation flow 27 to be executed by the information processing terminal 3 based on the content of the processing performed by the error processor 40 and stores the automation flow 27 in the storage section 11. Thereafter, the library execution 24 reads the automation flow 27 stored in the storage section 11, transmits the automation flow 27 to the information processing terminal 3, and causes the information processing terminal 3 to execute the automation flow 27.

An example in which RPA 38 is executed in the information processing terminal 3 and the image processing apparatus 2 executes a scan job will be described. For example, as one of routine works, a user may cause the image processing apparatus 2 to execute a scan job for reading an image of a document, acquire an electronic file of image data generated by the scan job, and transmit the electronic file by attaching it to an e-mail. Such routine work can be performed by causing RPA 38 to be executed at information processing terminal 3. In this case as well, the information processing terminal 3 transmits the setting file 25 to the image processing apparatus 2, designates the library 19 in which a plurality of processing included in a scan job are to be sequentially automatically executed in the image processing apparatus 2, and causes the image processing apparatus 2 to execute the library 19. Thus, the information processing terminal 3 can reduce the description amount of the processing sequence in the RPA 38.

FIG. 14 illustrates an example of a setting file 25 to be transmitted from the information processing terminal 3 to the image processing apparatus 2. As illustrated in FIG. 14, the setting file 25 includes scan settings for document reading. A file name to be attached to image data generated by reading a document is set in a setting file 25. Further, a file storage location for storing an electronic file of image data is set in the setting file 25.

FIG. 15 illustrates an example of the RPA 38 performed in the information processing terminal 3. This RPA 38 describes sequence for acquiring an electronic file generated by a scan job in the image processing apparatus 2, attaching the electronic file to an electronic mail, and transmitting the electronic mail to a predetermined address. Sequence 1 is processing of opening a mail application in the information processing terminal 3. Sequence 2 is processing of creating a new mail. Sequence 3 is processing of opening an address book application. Sequence 4 is processing of selecting a predetermined transmission destination address from an address book application. Sequence 5 is processing of inserting a pre-designated fixed phrase into the subject and the text. Sequence 6 is processing of transmitting the setting file 25 in FIG. 14 to the image processing apparatus 2. Sequence 7 is processing of transmitting a library execution command to the image processing apparatus 2. When the library execution command is transmitted in sequence 7, the execution of the library 19 is started in the image processing apparatus 2. Sequence 8 is processing of accessing a file storage location. Sequence 9 is processing of acquiring an electronic file generated by a scan job from a file storage location. Sequence 10 is processing of attaching the acquired electronic file to an e-mail. Sequence 11 is processing of transmitting an e-mail. Sequence 12 processing of closing the mail application.

Next, the library 19 to be executed in the image processing apparatus 2 will be described. FIG. 16 illustrates an example of processing sequence described in the library 19. Sequence 1 is processing of analyzing a setting file. Sequence 2 is processing of reflecting the scan setting in the scanner section 14. Sequence 3 is processing of starting document reading by the scanner section 14. Sequence 4 is processing of setting a file name to the image data generated by the scanner section 14 and generating an electronic file designated by the setting file 25. Sequence 5 is processing of accessing the file storage location designated by the setting file 25. Sequence 6 is processing of storing the electronic file in the file storage location. Sequence 7 is processing of transmitting an end notification to the information processing terminal 3.

During the execution of the library 19, the library execution 24 accesses the file storage location designated by the setting file 25 as a processing of sequence 5. At this time, if the access right is set to the file storage location, the access by the library execution 24 may be rejected. In that case, the library execution section 24 cannot perform the processing of sequence 5 and subsequent sequence, and an error occurs during execution of the library 19.

Figure 17:
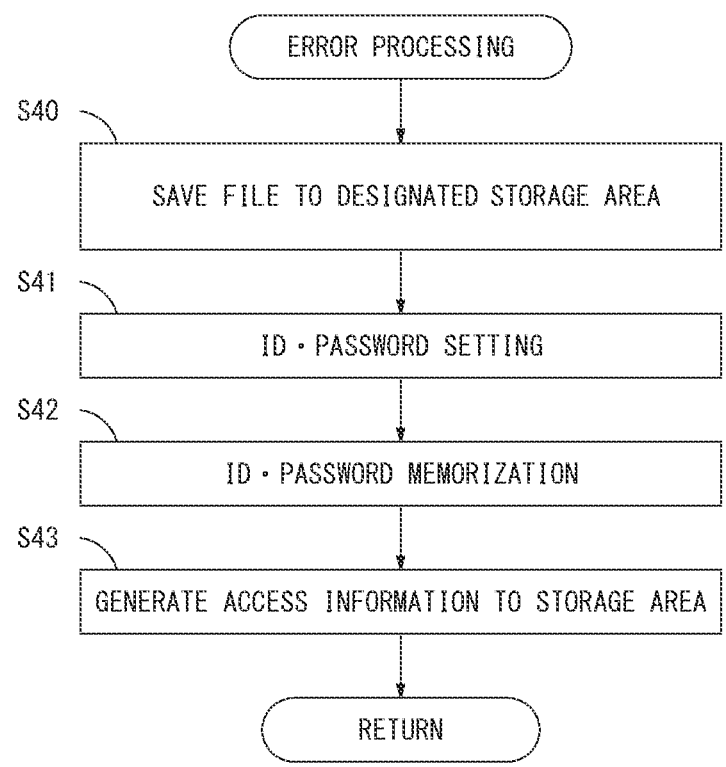
FIG. 17 is a flowchart illustrating an example of error processing.

When an error occurs in sequence 5 of the library 19, the error processor 40 executes error processing as illustrated in FIG. 17, for example. First, the error processor 40 stores the electronic file generated by the scan job in a predetermined storage area (folder) in the storage section 11 (step S40). Next, the error processor 40 sets an ID and a password for the storage area in which the electronic file is stored, and provides an access right to the storage area (step S41). Setting of the access right can prevent the electronic file from being acquired by a third party. At this time, it is preferable to use a random number or the like as the ID and the password to be set in the storage area. Next, the error processor 40 temporarily stores the set IDs and passwords in the storage area (step S42). Next, the error processor 40 generates information on access to the storage area in which the electronic file is stored (step S43). The access information includes a path to a storage area, an ID, and a password. Thus, the error processing by the error processor 40 ends.

Next, the automation flow creation 41 generates the automation flow 27 as illustrated in FIG. 18 based on the processing result of the error processor 40. Sequence 1 of the automation flow 27 illustrated in FIG. 18 is a processing of causing the information processing terminal 3 to access a storage area of the storage section 11 in which an electronic file is stored. The sequence 1 includes information on a path to a storage area in which an electronic file is stored. Therefore, when the information processing terminal 3 executes the processing of sequence 1, the information processing terminal 3 can automatically access the storage area in which the electronic file is stored. Sequence 2 is a processing of causing the information processing terminal 3 to input an ID and a password in order to indicate that there is an access right given to the storage area of the storage section 11. The sequence 2 includes information on the ID and the password temporarily stored by the error processor 40. Therefore, when the information processing terminal 3 executes the processing of sequence 2, the ID and the password for accessing the storage area can be automatically input. Sequence 3 is a processing of copying an electronic file stored in a storage area to a file storage location designated by the setting file 25. The information processing terminal 3 has an access right to the file storage location designated by the setting file 25. Therefore, the information processing terminal 3 can normally copy the electronic file stored in the storage area of the storage section 11 to the file storage location. Sequence 4 is a processing of deleting an electronic file from a storage area of the storage section 11.

When the automation flow 27 is generated by the automation flow creation 41, the library execution 24 transmits the automation flow 27 to the information processing terminal 3 and causes the information processing terminal 3 to execute the automation flow 27. At this time, the library execution 24 temporarily interrupts the execution of the RPA 38 and executes the processing sequence described in the automation flow 27. Thus, the information processing terminal 3 executes the processing sequence described in the automation flow 27 of FIG. 18 before starting the sequence 8 of the RPA 38 illustrated in FIG. 15. The information processing terminal 3 stores the electronic file stored in the storage section 11 of the image processing apparatus 2 in the file storage location by executing the processing based on the automation flow 27. When finishing the execution of the automation flow 27, the information processor 3 resumes the processing based on the RPA 38. That is, when finishing the execution of the automation flow 27, the data processing terminal 3 resumes the processing after sequence 8 of the RPA 38 illustrated in FIG. 15. As a result, the information processing terminal 3 can execute the processing sequence described in the RPA 38 to the end.

Figure 19:
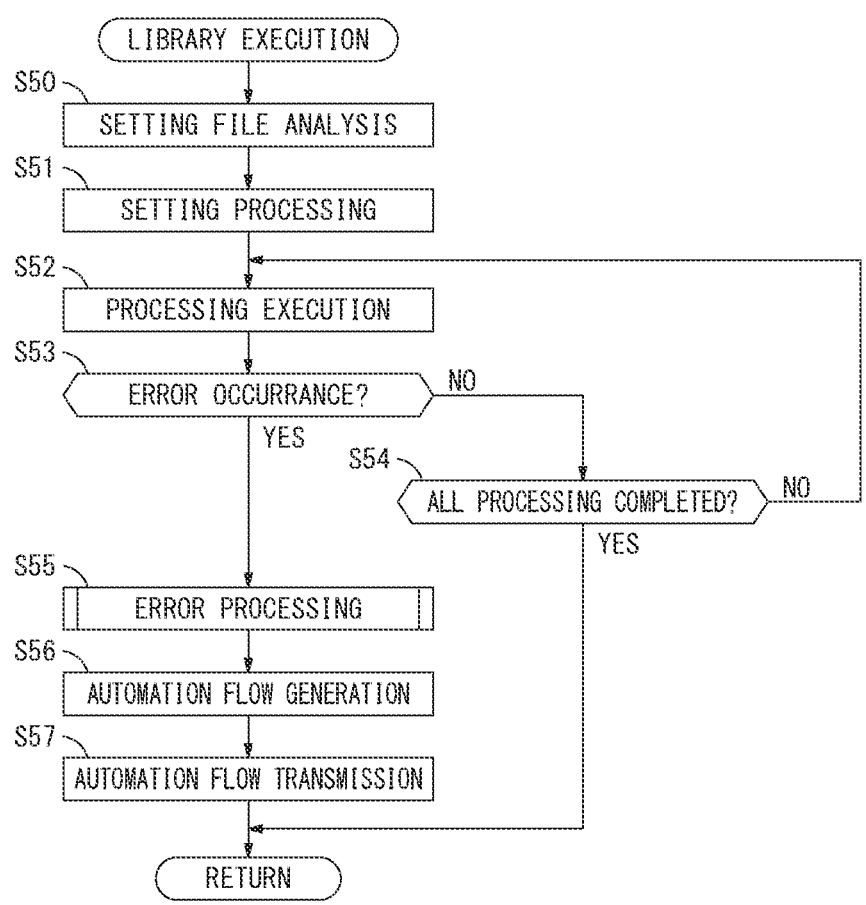
FIG. 19 is a flowchart illustrating an example of a processing sequence based on a library.

FIG. 19 is a flowchart illustrating an example of a processing sequence performed by the controller 10 of the image processing apparatus 2 based on the library 19. First, in the controller 10, the library executing section 24 operates to start execution of the library 19. When starting the execution of the library 19 illustrated in FIG. 16, the library execution 24 reads the setting file 25 acquired from the information processor 3, and analyzes the setting file 25 (step S50). The library execution 24 performs a setting processing of reflecting the scan setting based on the analysis result of the setting file 25 (step S51). Thereafter, the library execution 24 sequentially executes the processing of sequence 3 and thereafter described in the library 19 (step S52).

The library execution 24 determines whether or not an error has occurred while the processing described in the library 19 is being executed (step S53). When an error has not occurred (NO in step S53), the library execution 24 determines whether or not all the processing described in the library 19 has been completed (step S54). When all the processing described in the library 19 is not completed (NO in step S54), the library execution 24 returns to step S52 and executes the processing of the next sequence described in the library 19. When all processing is completed (YES in step S54), the processing by the library execution 24 ends.

On the other hand, when an error occurs during the execution of the library 19 (YES in step S53), the error processor 40 operates and executes error processing (step S55). At this time, the error processor 40 executes the error processing illustrated in FIG. 17. When the error processing is performed by the error processor 40, next, the automation flow creation 41 operates. The automation flow creation 41 generates the automation flow 27 illustrated in FIG. 18 based on the processing result of the error processor 40 (step S56). Thereafter, the library execution 24 transmits the automation flow 27 to the information processing terminal 3 and causes the information processing terminal 3 to execute processing based on the automation flow 27 (step S57). Thus, the processing by the controller 10 ends.

As described above, the image processing apparatus 2 of the present embodiment performs error processing for avoiding an error in a case where the error occurs during the execution of the library 19. This error processing is processing different from the processing described in the library 19. As a result, after performing the error processing, the image processing apparatus 2 enables the RPA 38 being executed at the information processing terminal 3 to continue to be executed. Specifically, the image processing apparatus 2 generates the automation flow 27, transmits the automation flow 27 to the information processing terminal 3, and causes the information processing terminal 3 to execute a processing based on the automation flow 27. Thus, the information processing terminal 3 executes the automation flow 27. After the execution of the automation flow 27, the information processor 3 can continuously execute the RPA 38. Therefore, the information processing terminal 3 does not have to describe in advance in the RPA 38 processing that presumes an error that may occur during execution of the library 19 in the image processing apparatus 2. Therefore, it is possible to reduce the description amount of the processing sequence described in the RPA 38.

The configuration and operation of the present embodiment other than the points described above are the same as those described in the first or second embodiment.

Fourth Embodiment

Next, the fourth embodiment of the present invention will be described. In the present embodiment, an error different from the error described in the third embodiment will be described. For example, when RPA 38 is executed in the image processing terminal 3 and the image processing apparatus 2 is caused to execute a scan job, if the number of documents increases, the memory of the controller 10 overflows in the middle of the document reading operation. In the present embodiment, an example in which a memory overflow error occurs during execution of a scan job will be described.

The configuration of the image processing apparatus 2 in the present embodiment is the same as that in the third embodiment. Further, in the present embodiment, the point that the image processing apparatus 2 performs error processing in a case where an error occurs during the execution of the library 19, generates the automation flow 27 based on the result of the error processing, and provides the automation flow 27 to the information processing terminal 3 is common to the third embodiment.

Figure 20:
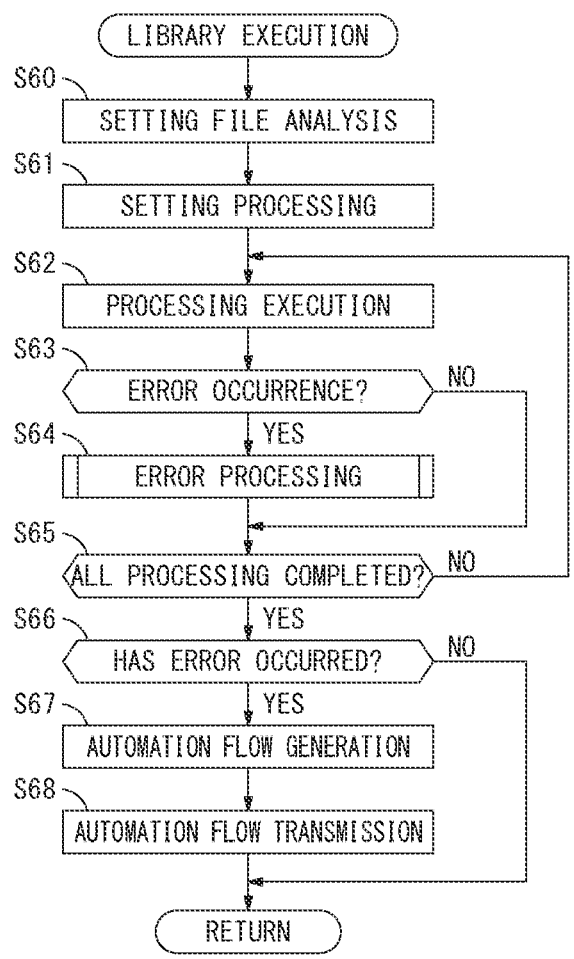
FIG. 20 is a flowchart illustrating an example of a processing sequence based on a library in the fourth embodiment.

FIG. 20 is a flowchart illustrating an example of a processing sequence performed by the controller 10 of the image processing apparatus 2 based on the library 19 in the fourth embodiment. First, in the controller 10, the library executing section 24 operates to start execution of the library 19. The library 19 executed by the library execution 24 is the same as the library 19 (see FIG. 16) described in the third embodiment.

When starting the execution of the library 19, the library execution 24 reads the setting file 25 acquired from the information processing terminal 3, and analyzes the setting file 25 (step S60). The library execution 24 performs a setting processing of reflecting the scan setting based on the analysis result of the setting file 25 (step S61). Thereafter, the library execution 24 sequentially executes the processing of sequence 3 and thereafter described in the library 19 (step S62). Thus, the image processing apparatus 2 starts a document reading operation.

The library execution 24 determines whether or not an error has occurred while the processing described in the library 19 is being executed (step S63). When an error occurs during the execution of the library 19 (YES in step S63), the error processor 40 operates and executes error processing (step S64). When an error has not occurred (NO in step S63), the library execution 24 determines whether or not all the processing described in the library 19 has been completed (step S65). When all processing described in the library 19 is not completed (NO in step S65), the library execution 24 returns to step S62 and executes the processing of the next sequence described in the library 19.

When all processing described in the library 19 is completed (YES in step S65), the controller 10 determines whether an error has occurred during the execution of the library 19 (step S66). When an error has not occurred (NO in step S66), the process performed by the controller 10 ends. In contrast, in a case where an error occurs (YES in step S66), the automation flow creation 41 operates. The automation flow creation 41 generates the automation flow 27 based on the result of the error processing (step S64) performed by the error processor 40 (step S67). Thereafter, the library execution 24 transmits the automation flow 27 to the information processing terminal 3 and causes the information processing terminal 3 to execute processing based on the automation flow 27 (step S68). Thus, the processing by the controller 10 ends.

Figure 21:
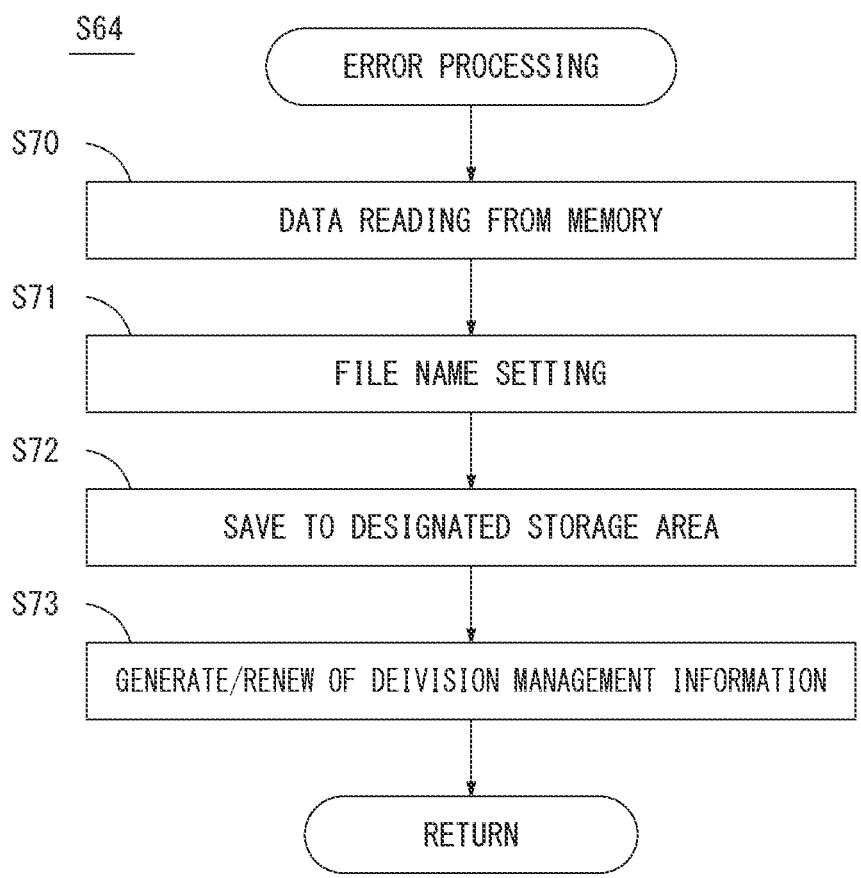
FIG. 21 is a flowchart illustrating an example of a detailed processing sequence of the error processing.

FIG. 21 is a flowchart illustrating an example of a detailed processing sequence of the error processing (step S64). This error processing is processing for avoiding an error in a case where a memory overflow error has occurred during the reading operation of the document. Upon starting the error processing (step S64), the error processor 40 reads an image from the memory provided in the controller 10 (step S70). If image data for plural pages is stored in the memory, the error processor 40 reads all the image data for plural pages. The error processor 40 generates an electronic file in which plural pages of image data read from the memory are collected in one file, and sets a file name to the electronic file (step S71). Next, the error processor 40 stores the electronic file to which the file name is set in a predetermined storage area of the storage section 11 (step S72). Thus, the overflowed memory can be released and the scan job can be resumed. After storing the electronic file in the predetermined storage area, the error processor 40 generates or updates a division management information 45 (step S73). Thus, the error processing (step S64) ends.

By performing the above-described error processing, when a memory overflow occurs during execution of a scan job, the error processor 40 can cause the scanner section 14 to perform divisional reading of a document by temporarily saving image data accumulated in the memory to a storage area of the storage section 11 and releasing the memory. Also, the error processor 40 records the division state of the document in the division management information 45. Therefore, when a memory overflow occurs during execution of a scan job, a plurality of electronic files (divided files) is generated by the error processor 40.

FIG. 22 illustrates an example of the division management information 45. FIG. 22 illustrates a case where three divided files are generated during execution of a scan job. A user name, a job name, a divided file name, a start page, an end page, and a path to a storage location where an electronic file (divided file) is stored are recorded in the division management information 45. Each time a memory overflow error occurs and a divided file is created, the error processor 40 adds information about the divided file to the division management information 45. This division management information 45 is used for integrating a plurality of divided files into a correct page order after the end of a scan job.

When at least one memory overflow error occurs during the execution of the library 19, the automation flow creation 41 generates the automation flow 27 for causing the information processing terminal 3 to integrate a plurality of divided files based on the division management information 45 generated by the error processor 40.

FIG. 23 illustrates the automation flow 27 generated by the automation flow creation 41. The automation flow 27 includes sequences 1 to 11. Sequence 1 is processing of activating a PDF-combined application in the information processing terminal 3. Sequence 2 is processing of causing the PDF-combined application activated on the information processing terminal 3 to access the storage location of the divided file. Sequence 3 is processing of causing the PDF-combined application to open the first divided file. Sequence 4 is processing of causing the PDF-combined application to combine the second divided file after the first divided file. Sequence 5 is processing of storing the combined electronic file in the file storage location as an electronic file having a file name defined in the setting file. Sequence 6 is processing of combining the third divided file after the electronic file. Sequence 7 is processing of overwriting and saving the combined electronic file in the file storage location. Sequence 8 is processing of deleting the first divided file from the divided file storage location. Sequence 9 is processing of deleting the second divided file from the divided file storage location. Sequence 10 is processing of deleting the third divided file from the divided file storage location. Sequence 11 is processing of causing the information processing terminal 3 to close the PDF-combined application.

By generating the automation flow 27 illustrated in FIG. 23 and causing the information processing terminal 3 to execute the automation flow 27, the image processing apparatus 2 can cause the information processing terminal 3 to combine a plurality of divided files that cannot be combined by the image processing apparatus 2.

As described above, the image processing apparatus 2 of the present embodiment creates the divided files by performing the error processing each time the error of the memory overflow occurs during the execution of the library 19. Upon completion of execution of the library 19, the image processing apparatus 2 generates the automation flow 27 for combining divided files, and causes the information processing terminal 3 to execute the automation flow 27. Therefore, the information processing terminal 3 does not needs to describe processing for combining division files in the RPA 38 in advance. Therefore, it is possible to reduce the description amount of the processing sequence described in the RPA 38.

The configuration and operation other than those described above in the present embodiment are the same as the configuration and operation described in the first to third embodiments.

MODIFICATION EXAMPLE

The preferred embodiments of the present invention have been described above. However, the present invention is not limited to the content described in the above-described embodiment, and various modification examples can be applied.

For example, in each of the above-described embodiments, the case where the image processing apparatus 2 is caused to execute the FAX transmission job or the scan job by executing the RPA 38 in the image processing terminal 3 has been exemplified. However, a job to be executed by the image processing apparatus 2 through execution of the RPA 38 in the information processing terminal 3 is not limited to a FAX transmission job or a scan job. For example, the RPA 38 may cause the image processing apparatus 2 to execute a copy job or a print job.

Also, in the third or fourth embodiment, an example in which the automation flow 27 is transmitted from the image processing apparatus 2 to the information processing terminal 3 in a case where an error occurs during the execution of the library 19 in the image processing apparatus 2 has been described. However, the timing at which the image processing apparatus 2 transmits the automation flow 27 to the information processing terminal 3 is not limited to the occurrence of an error. That is, the image processing apparatus 2 may transmit the automation flow 27 to the information processing terminal 3 when a predetermined condition is established while the library 19 is being executed.

In the above-described embodiment, an example in which the program 18 and the library 19 to be executed by the image processing apparatus 2 are stored in the image processing apparatus 2 in advance has been described. However, the program 18 and the library 19 are not limited to those stored in advance in the image processing apparatus 2. That is, the program 18 or the library 19 executed in the image processing apparatus 2 may be a transaction target by itself. In this case, the program 18 and the library 19 may be provided in a mode of being downloadable via a network such as the Internet, or may be provided in a state of being recorded in a computer-readable recording medium such as a CD-ROM.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus that is communicable with an information processing terminal and that operates based on a command from the information processing terminal when robotic process automation (RPA) for execution of a specific job is being executed in the information processing terminal, the image processing apparatus comprising:
    a storage section configured to store a library programmed in advance so as to sequentially and automatically execute a plurality of processing included in the specific job; and
    a hardware processor configured to receive an execution command for the library from the information processing terminal, and call and execute the library from the storage section.

2. The image processing apparatus according to claim 1, wherein
    the hardware processor
    acquires a setting file in which a setting for each of the multiple processing is described in response to the reception of the execution command; and
    when the library is executed, the multiple processing is sequentially and automatically executed based on the settings described in the setting file.

3. The image processing apparatus according to claim 1, wherein
    the hardware processor executes processing for notifying the information processing terminal that execution of the multiple processing has ended.

4. The image processing apparatus according to claim 1, wherein
    the storage section stores a plurality of libraries,
    the hardware processor calls and executes the library designated by the execution command from among the multiple libraries.

5. The image processing apparatus according to claim 1, wherein
    the storage section stores an automation flow to be executed in the information processing terminal,
    when a predetermined condition is established while the hardware processor is executing the library, the hardware processor reads the automation flow from the storage section and provides the automation flow to the information processing terminal, and causes the information processing terminal to execute processing based on the automation flow.

6. The image processing apparatus according to claim 1, wherein
    when a predetermined condition is established while the hardware processor is executing the library, the hardware processor creates an automation flow to be executed in the information processing terminal, and causes the information processing terminal to execute processing based on the automation flow.

7. The image processing apparatus according to claim 5, wherein
    the predetermined condition is occurrence of an error during the execution of the library.

8. The image processing apparatus according to claim 6, wherein
    the predetermined condition is occurrence of an error during the execution of the library.

9. The image processing apparatus according to claim 5, wherein
    when causing the information processing terminal to execute processing based on the automation flow, the hardware processor causes the information processing terminal to interrupt execution of the robotic process automation (RPA).

10. The image processing apparatus according to claim 6, wherein
    when causing the information processing terminal to execute processing based on the automation flow, the hardware processor causes the information processing terminal to interrupt execution of the robotic process automation (RPA).

11. An image processing system in which an image processing apparatus and an information processing terminal can communicate with each other, wherein
    the image processing apparatus stores a library programmed in advance so as to sequentially and automatically execute a plurality of processing included in a specific job,
    the information processing terminal transmits to the image processing apparatus an execution command of the library issued by the robotic process automation (RPA) configured to, during execution of robotic process automation (RPA) for causing the image processing apparatus to execute a specific job, and
    the image processing apparatus receives the execution command, and calls and executes the library.

12. The image processing system according to claim 11, wherein
    the information processing terminal, when an automation flow is received from the image processing apparatus during execution of the robotic process automation (RPA), interrupts the execution of the robotic process automation (RPA) and executes processing based on the automation flow.

13. The image processing system according to claim 12, wherein
the information processing terminal resumes execution of the robotic process automation (RPA) after execution of processing based on the automation flow ends.

14. A control method for an image processing apparatus that can communicate with an information processing terminal and stores a library programmed in advance so as to sequentially and automatically execute a plurality of processing included in a specific job, comprising:
when robotic process automation (RPA) for execution of the specific job is being executed in the information processing terminal, receiving an execution command for the library issued by the robotic process automation (RPA); and
calling and executing the library based on the execution command.

15. A non-transitory computer-readable recording medium storing a program to be executed in an image processing apparatus being communicable with an information processing terminal and including a storage section that stores a library programmed in advance so as to sequentially and automatically execute a plurality of processing included in a specific job, the program causing a hardware processor of the image processing apparatus to execute:
when robotic process automation (RPA) for execution of the specific job is being executed in the information processing terminal, receiving an execution command for the library issued by the robotic process automation (RPA); and
calling and executing the library based on the execution command.

* * * * *